United States Patent [19]

Fukahori et al.

[11] Patent Number: 4,899,323
[45] Date of Patent: Feb. 6, 1990

[54] ANTI-SEISMIC DEVICE

[75] Inventors: Yoshihide Fukahori, Hachioji; Hiromu Kojima, Higashimurayama; Akihiko Ogino; Shigenobu Suzuki, both of Kodaira; Toshikazu Yoshizawa, Hachioji, all of Japan

[73] Assignee: Bridgestone Corporation, Tokyo, Japan

[21] Appl. No.: 337,045

[22] Filed: Apr. 12, 1989

Related U.S. Application Data

[63] Continuation-in-part of Ser. No. 306,263, Feb. 1, 1989, abandoned, which is a continuation of Ser. No. 78,621, Jul. 28, 1987, abandoned.

[30] Foreign Application Priority Data

| Aug. 4, 1986 | [JP] | Japan | 61-183196 |
| Sep. 16, 1986 | [JP] | Japan | 61-217689 |
| Oct. 2, 1986 | [JP] | Japan | 61-234897 |
| May 2, 1988 | [JP] | Japan | 63-109604 |

[51] Int. Cl.$^4$ .............................................. E04B 1/98
[52] U.S. Cl. ................................ 367/176; 52/167 DF; 248/560; 248/638
[58] Field of Search ............... 367/176; 52/167; 248/560, 638; 181/146, 151, 166

[56] References Cited

U.S. PATENT DOCUMENTS

| 3,938,852 | 2/1976 | Hein | 14/16.1 |
| 4,050,665 | 9/1977 | Matthews | 248/638 |
| 4,483,426 | 11/1984 | Tagawa et al. | 52/167 |
| 4,566,231 | 1/1986 | Konsevich | 52/167 |

FOREIGN PATENT DOCUMENTS

| 0019533 | 11/1980 | European Pat. Off. |
| 1180205 | 6/1959 | France . |
| 1561224 | 3/1969 | France . |
| 2122018 | 8/1972 | France . |
| 2427446 | 12/1979 | France . |
| 2442941 | 6/1980 | France . |
| 2558879 | 8/1985 | France . |

Primary Examiner—Thomas H. Tarcza
Assistant Examiner—Ian J. Lobo
Attorney, Agent, or Firm—Kanesaka and Takeuchi

[57] ABSTRACT

An anti-seismic device which comprises anti-seismic rubber bearings and dampers arranged in parallel, the anti-seismic rubber bearing being formed by laminating a plurality of rigid hard plates and soft boards having a viscoelastic property one over another, the damper being composed mainly of a viscoelastic material having the physical properties (i) and (ii) defined below.

(i) the hysteresis ratio ($h_{50}$) is greater than 0.3 at 50% tensile deformation at 25° C.

(ii) the storage modulus (E) measured dynamically at a frequency of 5 Hz, a strain of 0.01%, and a temperature of 25° C. is in the range of $1 \leq E \leq 2 \times 10^4$ (kg/cm$^2$).

20 Claims, 18 Drawing Sheets

ANTI-SEISMIC DEVICE

CROSS-REFERENCE TO RELATED APPLICATIONS

This is a CIP application of U.S. Ser. No. 306,263 filed on Feb. 1, 1989, now abandoned, which in turn is a continuation of application Ser. No. 078,621 filed on July 28, 1987 abandoned.

FIELD OF THE INVENTION AND RELATED ART STATEMENT

The present invention relates to an improvement of the anti-seismic device which consists of dampers and anti-seismic rubber bearings arranged in parallel, thereby producing both the anti-seismic effect and the damping effect, said dampers absorbing vibrational energy or earthquake motion (abbreviated as vibration hereinafter) applied to machines and structures at the time of earthquake.

Dampers have long been known as a means to reduce vibration applied to machines and structures by an earthquake. Their ability to absorb vibrational energy is derived from the material of which they are constructed. They fall into two main groups; those which utilize the plastic effect of a metal such as lead, and those which utilize the viscous effect of oil.

Much attention is now focused on a body (anti-seismic rubber bearing) formed by laminating alternately a plurality of steel plates and rubber boards. It is designed to protect an object it supports from vibration at the time of earthquake.

Such an anti-seismic rubber bearing is flexible (or has a low shear modulus) in its lateral direction. Because of this property, anti-seismic rubber bearings interposed between a rigid structure such as a concrete building and the foundation thereof shift the natural frequency of the structure from the seismic frequency, thereby greatly reducing the acceleration applied to the structure by an earthquake.

A feature of the anti-seismic rubber bearing of this type is its ability to undergo elastic deformation which permits the restoration to its original shape after an earthquake. However, the anti-seismic rubber bearing itself has an extremely limited energy absorbing ability (damping effect) so that the subsidence of a building resulting from its creeping is minimized. For this reason, the conventional anti-seismic rubber bearing is made of rubber having a low hysteresis loss.

In the case of an anti-seismic device composed of the above-mentioned low damping anti-seismic rubber bearings alone, the structure installed on them continues to shake horizontally for a long time even after an earthquake is over. This horizontal shaking, if excessive, may cause damage to the anti-seismic rubber bearings themselves as well as the building and utility such as water pipes, gas pipes, and wirings.

The conventional way to diminish the horizontal shaking in as short a time as possible was to combine an anti-seismic rubber bearing with a plastic damper of soft metal or the like which undergoes plastic deformation as soon as it receives a seismic force. For example, this damper is formed by filling a void in the anti-seismic rubber bearing with lead. The thus formed device produces both the anti-seismic effect and the damping effect.

A disadvantage of the conventional damper utilizing the plastic effect is that it produces the damping effect very little when the deformation is small, in which case the deformation is elastic deformation.

A disadvantage of the conventional damper utilizing the viscous effect of oil is that it has to be large in size if it is to produce a considerable damping effect. An additional disadvantage is that the handling of oil needs care, the fabrication is difficult, and the complex maintenance work is required for use over a long period of time.

The anti-seismic device having a conventional built-in plastic damper absorbs more seismic energy than that without a plastic damper; however, it in turn has a shortcoming of resonating in the high-frequency region because the plastic damper has a high elastic modulus.

The lead-filled anti-seismic rubber bearing has a disadvantage that when it greatly deforms at the time of large earthquake the hard plates such as steel plates damage the lead and the damaged lead in turn damages the soft boards such as rubber boards, which leads to the entire breakage of the anti-seismic rubber bearing. The damaged lead tends to break easily when it undergoes great deformation repeatedly.

There is disclosed a vibration damping stiffener in U.S. Pat. No. 4,566,231. This produces almost no damping effect at the vibration frequencies of earthquakes.

OBJECT AND SUMMARY OF THE INVENTION

It is an object of the present invention to provide an anti-seismic device which produces both the anti-seismic effect and the damping effect. The anti-seismic device is provided with a viscous damper which is characterized by:

(1) its constituent material which exhibits the maximum viscosity effect (damping effect), (2) its structure which permits the constituent material to fully exhibit its viscosity effect (damping effect), (3) ease of molding and fabrication, (4) easy handling, and (5) low cost.

The anti-seismic device of the invention comprises anti-seismic rubber bearings and dampers arranged in parallel, the anti-seismic rubber bearing being formed by laminating a plurality of rigid hard plates and viscoelastic soft board on top of the other, the damper being composed mainly of a viscoelastic material having the physical properties (i) and (ii) defined below.

(i) the hysteresis ratio ($h_{50}$) is greater than 0.3 at 50% tensile deformation at 25° C.

(ii) the storage modulus (E) measured dynamically at a frequency of 5 Hz, a strain of 0.01%, and a temperature of 25° C. is in the range of $1 \leq E \leq 2 \times 10^4$ (kg/cm$^2$).

In order to eliminate the disadvantages of the conventional viscous damper, the present inventors carried out extensive studies on the ideal viscous damper having the above-mentioned merits (1) to (5). As the result, it was found that the satisfactory damping effect is produced when the damper is made of a viscoelastic material which has the hysteresis ratio, Mooney viscosity, and storage modulus in a certain range. It was also found that when the dampers of this type are combined with anti-seismic rubber bearings in parallel, the resulting anti-seismic device supports a building stably for a long period of time and reduces the vibration transmitted to the building it supports. These findings led to the present invention.

DESCRIPTION OF THE PREFERRED EMBODIMENTS

In what follows, a detailed description will be made of the present invention.

The damper as a constituent member of the anti-seismic device of the present invention is made mainly of a viscoelastic material having the physical properties as defined in sections (i) and (ii) below.

Figure 5:
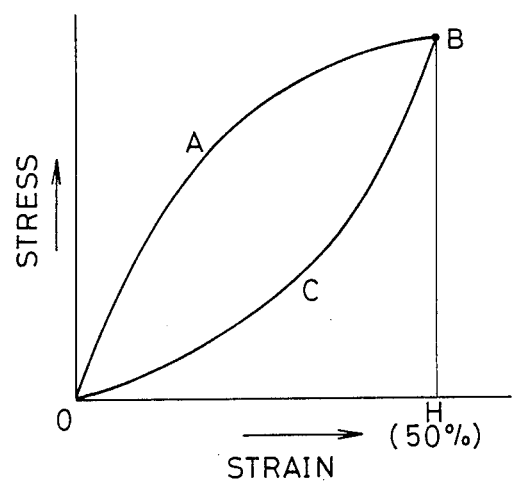
FIG. 5 is a graph showing a stress-strain curve of a material.
Figure 6:
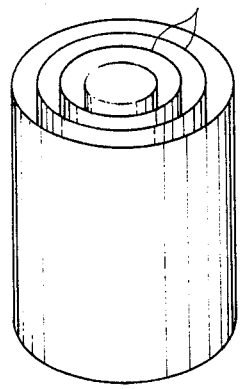
FIGS. 6(a) to 6(e) are perspective views showing the partitioning members.
Figure 6:
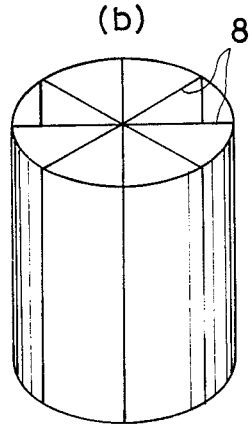
Figure 6:
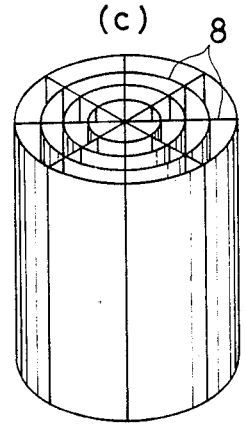
Figure 6:
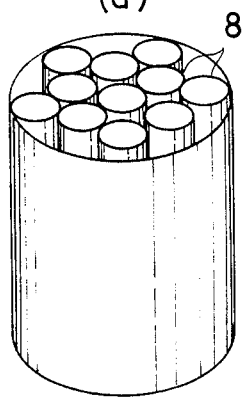
Figure 6:
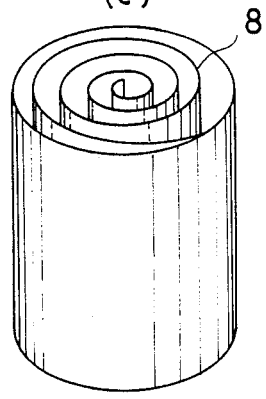

(i) The hysteresis ratio ($h_{50}$) at 50% tensile deformation at 25° C. is greater than 0.3, preferably greater than 0.35, more preferably greater than 0.4. The hysteresis ratio ($h_{50}$) is the ratio of are to area $\widehat{OABCO}$ to area $\widehat{OBAHO}$ in the stress-strain curve (at a pull speed of 200 mm/min) shown in FIG. 5.

(ii) The storage modulus of elasticity (E) dynamically measured at a frequency of 5 Hz, a strain of 0.01%, and a temperature of 25° C. is in the range of $1 \leq E \leq 2 \times 10^4$ (kg/cm$^2$), preferably greater than $1 \times 10^4$ (kg/cm$^2$), more preferably greater than $5 \times 10^3$ (kg/cm$^2$), and most desirably greater than 1 and smaller than $2 \times 10^3$ (kg/cm$^2$).

The viscoelastic material should have an elongation (at tensile break) greater than 1%, preferably greater than 5%, more preferably greater than 10%, and most desirably greater than 20%.

The viscoelastic material for the damper in the present invention includes unvulcanized rubber, vulcanized rubber, and synthetic resins and plastic materials having the above-mentioned characteristic properties.

According to the present invention, the viscoelastic material should preferably be unvulcanized rubber, vulcanized rubber, or a similar material having the above-mentioned hysteresis ratio and elastic modulus. Their examples include common rubber such as ethylene-propylene rubber (EPR, EPDM), nitrile rubber (NBR), butyl rubber, halogenated butyl rubber, chloroprene rubber (CR), natural rubber (NR), isoprene rubber (IR), styrene-butadiene rubber (SBR), butadiene rubber (BR), acrylic rubber, ethylene-vinyl acetate rubber (EVA), and polyurethane rubber; special rubber such as silicone rubber, fluororubber, ethylene-acrylic rubber, polyester elastomer, epichlorohydrin rubber, and chlorinated polyethylene; and thermoplastic elastomers. If the viscoelastic material is unvulcanized rubber, it is desirable that the Mooney viscosity $ML_{1+4}$ at 100° C. be higher than 10.

These rubber materials may be used alone or in combination with one another. In addition, they may be incorporated with additives such as filler, tackifier, slip agent, antioxidant, plasticizer, softening agent, low-molecular weight polymer, and oil which are commonly used for rubber processing to impart desired hardness, loss characteristics, and durability according to the object of use. Where the rubber materials are required to maintain the desired performance over a long period of time, they should be stabilized by adding a proper antioxidant, polymerization inhibitor, anti-scorching agent, etc. and/or by modifying the polymer itself by hydrogenation, etc.

Where it is necessary to bond the viscoelastic material to other constituent material, the bonding may be advantageously accomplished by utilizing the stickiness of the viscoelastic material. To ensure the bonding by stickiness, a network structure may be formed in the interface by chemical bonding or physical bonding.

The viscoelastic material in the present invention may be selected from the following materials in addition to the above-mentioned unvulcanized rubber and vulcanized rubber: thermoplastic resins such as polystyrene, polyethylene, polypropylene, ABS, polyvinyl chloride, polymethyl methacrylate, polycarbonate, polyacetal, nylon, polyether chloride, polytetrafluoroethylene, polyfluorochloroethylene, polyfluoroethylene-propylene, acetyl cellulose, ethyl cellulose, polyvinylidene, vinyl butyral, and polypropylene oxide; and rubber-modified products thereof: thermosetting resins such as epoxy resin and unsaturated polyester, and rubber-modified products thereof. These plastics may be incorporated with the following filler, plasticizer, softening agent, tackifier, oligomer, slip agent, antioxidant, and low-molecular weight polymer oil according to need. These plastics may be used alone or in combination with one another.

(a) Filler: Flaky inorganic filler such as clay, diatomaceous earth, carbon black, silica, talc, barium sulfate, calcium carbonate, magnesium carbonate, metal oxide, mica, graphite, and aluminum hydroxide; granular or powdery filler such as metal powder, wood chips, glass powder, ceramics powder, and polymer powder or granules; and natural and artificial short fibers and long fibers (such as straw, wool, glass fiber, metal fiber, and polymer fiber), which are used for rubbers and resins.

The amount of the filler should preferably be 30–250 parts by weight for 100 parts by weight of rubber.

The short fibers include glass short fiber, plastics short fibers, and natural short fibers. They also include the following special reinforcing short fibers. The short fibers should preferably be chemically bonded to the rubber just like the molecule of vulcanizable rubber is grafted with short fibers of thermoplastic polymer having the

group through a precondensate of phenol-formaldehyde resin. The thermoplastic polymer for short fibers should be one which has the —CONH— group in the polymer molecule. Examples of this polymer include nylons such as nylon-6, nylon-610, nylon-12, nylon-611, and nylon 612; polyurea such as polyheptamethylene urea and polyundecamethylene urea; and polyurethane, which have a melting point of 190°–235° C., preferably 190°–225° C., and more preferably 200°–220° C. They should be added in an amount of 30–250 parts by weight. The short fibers should have an average diameter of 0.05–0.8 μm and a circular cross section. The short fiber should have a minimum fiber length greater than 1 μm. In addition, the short fiber should be composed of molecules oriented in the axial direction.

(b) Softening agent: Aromatic, naphthenic, and paraffinic softening agents for rubbers and resins.

The preferred amount of the softening agent is 5–150 parts by weight for 100 parts by weight of rubber.

(c) Plasticizer: Ester-type plasticizer such as phthalic ester, mixed phthalic ester, ester of dibasic aliphatic acid, glycol ester, ester of fatty acid, phosphoric ester, and stearic ester; epoxy-type plasticizer; and other plasticizers for plastics. Phthalate-, adipate-, sebacate-, phosphate-, polyester-, and polyester-type plasticizers for NBR.

The preferred amount of the plasticizer is 5–150 parts by weight for 100 parts by weight of rubber.

(d) Tackifier: Coumarone resin, coumarone-indene resin, phenol-terpene resin, petroleum hydrocarbon, and rosin derivative.

The preferred amount of the tackifier is 1–50 parts by weight for 100 parts by weight of rubber.

(e) Oligomer: Fluorine-containing oligomer, polybutene, xylene resin, chlorinated rubber, polyethylene wax, petroleum resin, rosin ester rubber, polyalkylene glycol diacrylate, liquid rubber (such as polybutadiene, styrene-butadiene rubber, butadiene-acrylonitrile rubber, and polychloroprene), silicone oligomer, and poly-α-olefins.

The preferred amount of the oligomer is 5–100 parts by weight for 100 parts by weight of rubber.

(f) Slip agent: Hydrocarbon-type slip agent such as paraffin and wax; fatty acid-type slip agent such as higher fatty acid and hydroxy fatty acid; fatty acid amide-type slip agent such as alkylene bisfatty acid amide; ester-type slip agent such as lower alcohol ester of fatty acid, polyhydric alcohol ester of fatty acid, and polyglycol ester of fatty acid; alcohol-type slip agent such as aliphatic alcohol, polyhydric alcohol, polyglycol, and polyglycerol; and metal soap; and mixtures thereof.

The preferred amount of the slip agent is 1–50 parts by weight for 100 parts by weight of rubber.

In the present invention, the viscoelastic material may be a natural product such as bitumen and clay. However, unvulcanized rubber having the above-mentioned characteristic properties is most preferable when all factors are taken into account.

In the meantime, rubber in an unvulcanized state is poor in restoring property and flows slowly with time, losing its shape after a long period of time. Therefore, in the case where the viscoelastic material used for the damper is a soft material such as unvulcanized rubber, it is necessary to cover it with vulcanized rubber or other proper material so that the flow of the unvulcanized rubber is prevented. This surface covering also permits the damper to undergo great deformation.

The vulcanized rubber used for covering (referred to as "covering rubber" hereinafter) may be produced from any of the above-mentioned vulcanized rubber. In other words, the unvulcanized rubber as the internal viscoelastic material of the damper may have a formulation identical with or similar to that of the vulcanized rubber for the covering layer. Needless to say, they may be entirely different from each other.

For the damper of the present invention to be durable for a long period of time, the covering rubber should be made of one having good weather resistance. Examples of weather-resistant rubber include butyl rubber, acrylic rubber, polyurethane, silicone rubber, fluororubber, polysulfide rubber, ethylene-propylene rubber (ERP and EPDM), Hypalon, chlorinated polyethylene, ethylene-vinyl acetate rubber, epichlorohydrin rubber, and chloroprene rubber. Of these, butyl rubber, polyurethane, ethylene-propylene rubber, Hypalon, chlorinated polyethylene, ethylene-vinyl acetate rubber, and chloroprene are especially effective.

These rubber materials may be used individually or in combination with one another. For the improvement of their elongation and other physical properties, they may be blended with commercial rubber such as natural rubber, isoprene rubber, styrene-butadiene rubber, butadiene rubber, and nitrile rubber. In addition, these rubber materials may be incorporated with additives such as filler, antioxidant, plasticizer, softener, and oil which are commonly used for rubber processing. A preferred rubber compound is composed of 100 parts by weight of rubber, 10–40 parts by weight of cyclopentadiene or dicyclopentadiene resin, and 5–20 parts by weight of rosin. This rubber compound is greatly improved in fracture properties and adhesion to metals.

The following experiments were conducted in order to make clear the properties of the rubber materials of the invention.

Rubber materials Nos. 1 to 13 and resin materials Nos. 14 to 16 shown in the following tables were examined for physical properties, namely, hysteresis ratio (h$_{50}$), storage modulus (E), and elongation at tensile break.

The compositions of the materials are indicated in the column "composition" in the tables. Rubber materials Nos. 1 to 4 are not cured, rubber materials Nos. 5 and 6 are cured slightly, and rubber materials Nos. 10 to 13 (which are comparative examples) are cured fully. (The slight curing is accomplished by using the crosslinker in a less amount, say 10 to 60%, than usual.) Resin materials Nos. 14 to 16 are not cured.

In the tables, PVC stands for polyvinyl chloride, PVAc stands for vinyl chloride-vinyl acetate copolymer, BBP stands for butyl benzyl phthalate, and DCPD stands for dicyclopentadiene resin.

The hysteresis ratio $h_{50}$ and the storage modulus E are measured in the same manner as described in the specification of the present application.

The test piece used for measuring $h_{50}$ is a ring in shape having an outside diameter of 25 mm and an inside diameter of 21 mm. The test piece used for measuring E is 50 mm long, 5 mm wide, and 2 mm thick. The test piece used for measuring elongation at tensile break is a dumbbell in shape conforming to JIS K6301. It was pulled at a rate of 200 mm/min at 25° C.

above-mentioned properties, said hard plates and said soft layers being laminated one over another, with the external surface of said soft layers covered with vulcanized rubber.

(2) One which is composed of a viscoelastic material having the above-mentioned properties and a solid substance embedded in said viscoelastic material, with the external surface of the soft body covered with vulcanized rubber.

(3) One which is composed merely of a viscoelastic material having the above-mentioned properties, with the external surface of the soft body covered with vulcanized rubber.

(4) One which is composed of a viscoelastic material having the above-mentioned properties and at least one skeleton of reticulated structure, corrugated structure, honeycomb structure, and woven stuff, with the exter-

|  | 1 | | 2 | | 3 | | 4 | |
|---|---|---|---|---|---|---|---|---|
| Composition (parts by weight) | NR | 100 | SBR | 100 | EPDM | 100 | CR | 100 |
| | Carbon black | 20 | Carbon black | 20 | Carbon black | 60 | Carbon black | 20 |
| | Zinc oxide | 5 | Zinc oxide | 5 | Zinc oxide | 5 | Zinc oxide | 5 |
| | Antioxidant | 3 | Antioxidant | 3 | Antioxidant | 3 | Antioxidant | 3 |
| | | | | | DCPD | 20 | | |
| | | | | | Rosin | 10 | | |
| Curing conditions | not cured | | not cured | | not cured | | not cured | |
| Properties | | | | | | | | |
| $h_{50}$ | 0.60 | | 0.71 | | 0.65 | | 0.63 | |
| E(kg/cm$^2$) | 31 | | 69 | | 150 | | 87 | |
| Elongation at break (%) | 100 and up | | 100 and up | | 100 and up | | 100 and up | |

|  | 5 | | 6 | | 7 | | 8 | |
|---|---|---|---|---|---|---|---|---|
| Composition (parts by weight) | NR | 50 | EPDM | 100 | EPDM | 70 | NR | 67 |
| | BR | 50 | Graphite | 150 | NR | 30 | BR | 33 |
| | Carbon black | 85 | Aromatic oil | 20 | Carbon black | 60 | Carbon black | 80 |
| | DCPD | 60 | Sulfur | 0.45 | Zinc oxide | 5 | Zinc oxide | 5 |
| | Phenolic resin | 30 | | | Antioxidant | 3 | Antioxidant | 3 |
| | Sulfur | 0.45 | | | DCPD | 20 | DCPD | 60 |
| | | | | | Rosin | 10 | Sulfur | 1.5 |
| | | | | | Sulfur | 1.5 | | |
| Curing conditions | slightly cured | | slightly cured | | fully cured | | fully cured | |
| Properties | | | | | | | | |
| $h_{50}$ | 0.55 | | 0.48 | | 0.48 | | 0.43 | |
| E(kg/cm$^2$) | 1020 | | 250 | | 220 | | 330 | |
| Elongation at break (%) | 100 and up | | 100 and up | | 100 and up | | 100 and up | |

|  | 9 | | 10 | | 11 | | 12 | |
|---|---|---|---|---|---|---|---|---|
| Composition (parts by weight) | BR | 67 | NR | 70 | NR | 30 | SBR | 30 |
| | NR | 33 | BR | 30 | BR | 70 | Carbon black | 20 |
| | Carbon black | 70 | Carbon black | 15 | Carbon black | 70 | Zinc oxide | 5 |
| | Zinc oxide | 5 | Zinc oxide | 5 | Zinc oxide | 5 | Antioxidant | 3 |
| | Antioxidant | 3 | Antioxidant | 3 | Antioxidant | 3 | Sulfur | 1.5 |
| | DCPD | 30 | DCPD | 5 | Sulfur | 1.5 | | |
| | Aromatic oil | 15 | Sulfur | 1.5 | | | | |
| | Sulfur | 1.5 | | | | | | |
| Curing conditions | fully cured | | fully cured | | fully cured | | fully cured | |
| Properties | | | | | | | | |
| $h_{50}$ | 0.38 | | 0.07 | | 0.19 | | 0.25 | |
| E(kg/cm$^2$) | 150 | | 26 | | 190 | | 23 | |
| Elongation at break (%) | 100 and up | | 100 and up | | 100 and up | | 100 and up | |

|  | 13 | | 14 | | 15 | | 16 | |
|---|---|---|---|---|---|---|---|---|
| Composition (parts by weight) | EPDM | 100 | PVC | 85 | Low-density PE | 100 | PMMA | 100 |
| | Carbon black | 20 | PVAc | 15 | | | BBP | 70 |
| | Zinc oxide | 5 | BBP | 100 | | | Carbon black | 10 |
| | Antioxidant | 3 | Glass powder | 100 | | | | |
| | Sulfur | 1.5 | | | | | | |
| Curing conditions | fully cured | | not cured | | not cured | | not cured | |
| Properties | | | | | | | | |
| $h_{50}$ | 0.24 | | 0.87 | | 0.76 | | 0.81 | |
| E(kg/cm$^2$) | 35 | | 8500 | | 9800 | | 9100 | |
| Elongation at break (%) | 100 and up | | 100 and up | | 100 and up | | 100 and up | |

The exposed parts of the damper may be coated with a proper protecting agent to improve weather resistance.

The damper as the constituent elements of the antiseismic device of the invention may have the following embodiments.

(1) One which is composed of a plurality of rigid hard plates and soft layers of viscoelastic material having the nal surface of the soft body covered with vulcanized rubber. This embodiment may be produced as follows:

(4-1) By integrating under pressure the skeleton and viscoelastic material.

(4-2) By placing the skeleton and viscoelastic material alternately one over another.

(4-3) By placing the integral body of the skeleton and viscoelastic material (formed as in 4-1) and the skeleton and/or viscoelastic material alternately one over another.

(4-4) By combining the unit produced as in 4-1 to 4-3 with a plate or wire through lamination or any other proper means.

(5) The same embodiments as in 1-4 above, except that the external surface is not covered with vulcanized rubber.

The structure of the damper in the present invention is not limited to those of 1 to 5 above. For example, the covering rubber is not always necessary; instead, the damper may be held between two solid plates or enclosed in a container.

Another preferred embodiment of the damper used in the present invention is characterized by that at least one part thereof is made of slightly vulcanized rubber which is formed by vulcanizing a rubber compound incorporated with a vulcanizing agent in an amount equivalent to 1-70 wt % of the minimum amount used in common practice.

Figure 35:
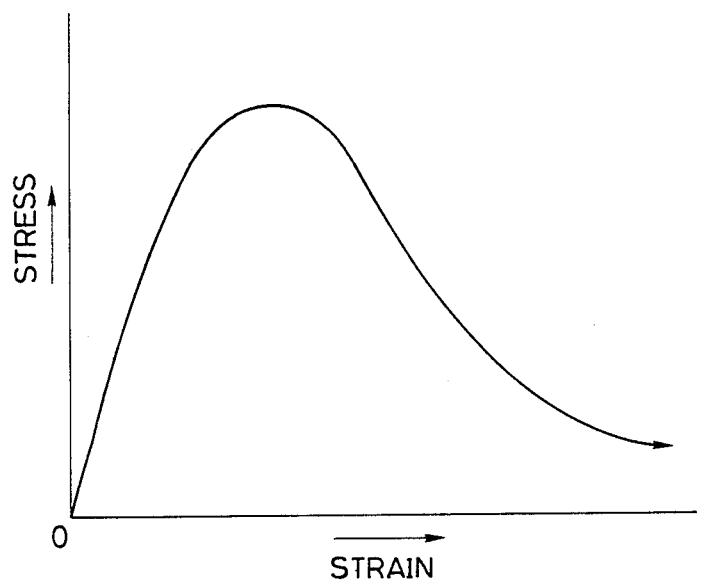
FIG. 35 is a stress-strain curve of unvulcanized rubber.

It is known well that a rubber material in the unvulcanized state exhibits an extremely high damping performance because it is an organic viscous body having a high molecular weight in such a state. Further, unvulcanized rubber exhibits a considerably high elastic modulus in the region of small deformation, as shown in FIG. 35; however, it rapidly decreases in elastic modulus when it undergoes large deformation (strain). For this reason, it lacks sufficient strength necessary for practical use. On the other hand, a rubber material comes to have a high elastic modulus and strength (which lead to a high restoring force) when it is sufficiently vulcanized (given a large number of crosslink points). Vulcanization, however, brings about a sharp decrease in damping performance (hysteresis loss).

The damper described herein as a preferred embodiment has both the high hysteresis (of unvulcanized rubber) and the outstanding mechanical properties (of vulcanized rubber), because it is made of rubber only slightly vulcanized with a small amount of vulcanizing agent.

The only slightly vulcanized rubber can be prepared from any rubber which can be vulcanized with a vulcanizing agent. Preferred examples of the rubber include ethylene-propylene rubber (EPR, EPDM), nitrile rubber (NBR), butyl rubber (IIR), halogenated butyl rubber (CIR), chloroprene rubber (CR), natural rubber (NR), isoprene rubber (IR), styrene-butadiene rubber (SBR), butadiene rubber (BR), acrylic rubber (AR), ethylene-vinyl acetate rubber (EVA), polyurethane (UR), silicone rubber (SiR), fluororubber (FR), chlorosulfonated polyethylene (CSM), and chlorinated polyethylene (CPE). They may be used alone or in combination with one another. To impart desirable hardness, loss characteristics, and durability according to the object of use, they may be incorporated with additives such as filler, tackifier, slip agent, antioxidant, plasticizer, softener, low-molecular weight polymer, and oil which are commonly used for rubber processing. Where the rubber is required to maintain its performance over a long period of time, it should be incorporated with a stabilizer (such as antioxidant, inhibitor, and antiscorch), or modified by hydrogenation or the like, so that it is stabilized. The above-mentioned additives can be used for stabilization.

The slight vulcanization is achieved by incorporating the rubber with a controlled amount of vulcanizing agent as explained in the following. In general, the optimum amount of vulcanizing agent (or the optimum crosslink density) is limited with some allowance for individual rubber compounds, so that the resulting vulcanized rubber has the necessary performance such as elastic modulus, strength, fatigue resistance, adhesion, and restoring force. On the other hand, the crosslink density of rubber is determined by the total amount of sulfur (or organic peroxide) and vulcanization accelerator (which are collectively referred to as "vulcanizing agent" hereinafter), because vulcanization is usually accomplished by using (1) sulfur as a major ingredient in combination with a vulcanization accelerator, (2) a small amount of sulfur and a large amount of vulcanization accelerator, or (3) an organic peroxide.

Rubber materials vary in physical properties depending on the vulcanizing (crosslinking) conditions. Commercial vulcanizing agents for a large variety of rubber compounds are shown in "Kogyo Zairyo" Vol. 29, No. 11 (1981), pp. 37-136 (published in Japan). According to this literature, individual rubber compounds are vulcanized with an average amount and minimum amount of vulcanizing agent as shown in Table 1. The amount is expressed in phr (parts by weight for 100 parts by weight of rubber).

TABLE 1

| Rubber | Average amount of vulcanizing agent (phr) | Minimum amount of vulcanizing agent (phr) |
|---|---|---|
| IR | 3.0 | 2.75 |
| SBR | 2.75 | 2.70 |
| BR | 2.4 | 1.30 |
| NR | 3.1 | 3.0 |
| NBR | 3.5 | 1.75 |
| CR | 1.0 | 0.8 |
| IIR | 3.0 | 2.75 |
| EPR | 3.5 | 2.72 |
| EPDM | 3.0 | 2.1 |
| AR | 1.5 | 1.0 |
| SiR | 0.75 | 0.55 |
| FR | 3.0 | 1.5 |
| CSM | 2.5 | 2.5 |
| CIR | 1.0 | 1.0 |
| CPE | 4.0 | 4.0 |
| UR | 8.0 | 3.0 |

CIR: halogenated butyl rubber

For a rubber compound to be made into a rubber product having a balanced performance, it should be incorporated with an optimum amount of vulcanizing agent, as mentioned above. This optimum amount corresponds to the average amount given in Table 1. On the other hand, "the minimum amount" in Table 1 applies to a special case in which the vulcanizing agent is used in a small amount purposely.

According to the present invention, the rubber shown in Table 1 should be incorporated with a vulcanizing agent in an amount equal to 1-70 wt %, preferably 5-60 wt %, and more preferably 10-50 wt % of the minimum amount.

Such a small amount of vulcanizing agent gives rise to the only slightly vulcanized rubber for the damper of the present invention, which has a hysteresis ($h_{50}$)

higher than 0.3, preferably higher than 0.35, and more preferably higher than 0.4 at 50% tensile deformation at 25° C.

The only slightly vulcanized rubber should have a glass transition temperature (Tg) outside the range of $-10°$ C. to 30° C. and storage moduli (E) at $-10°$ C. and 30° C. for repeated deformation of 0.01% at 5 Hz whose ratio (E at $-10°$ C. to E at 30° C.) is lower than 10, preferably lower than 7, and more preferably lower than 5, and most desirably lower than 3.

The damper made of the only slightly vulcanized rubber has the structure as explained in the following with reference to the accompanying drawing.

The structure of the damper is classified into the following three groups.

(A) Simple structure made of the only slightly vulcanized rubber as the major constituent.

(B) Composite structure made of the only slightly vulcanized rubber and a hard material.

(C) Composite unit in which the body of structure (A) or (B) is combined with hard plates.

The simple structure (A) is further divided into the following four subclasses.

Figure 22:
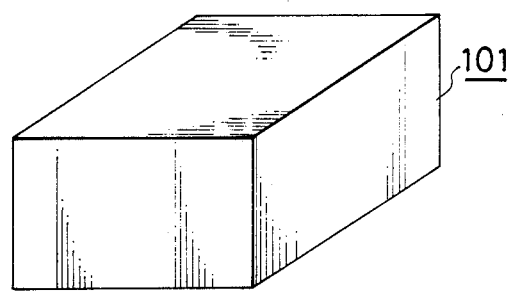
FIGS. 22 to 34 are perspective views showing the preferred examples of the damper.
Figure 23:
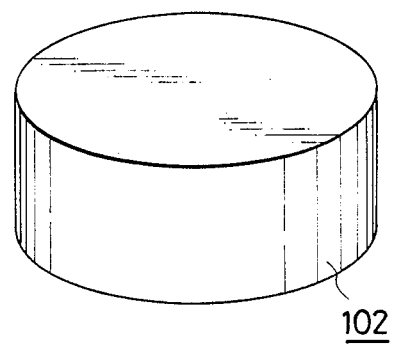

(A-1) Monolithic structure which is made of the only slightly vulcanized rubber alone. Examples of this structure are shown in FIG. 22 (rectangular prism) and FIG. 23 (cylinder). The shape of the product (damper) may be properly selected according to the object of use.

Figure 24:
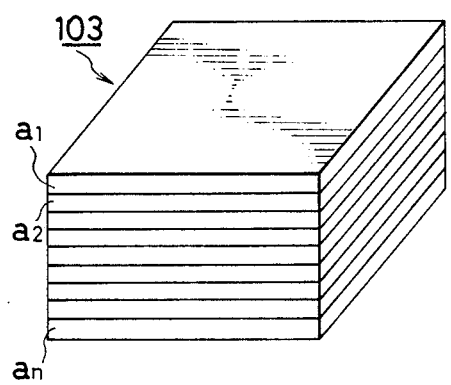
Figure 25:
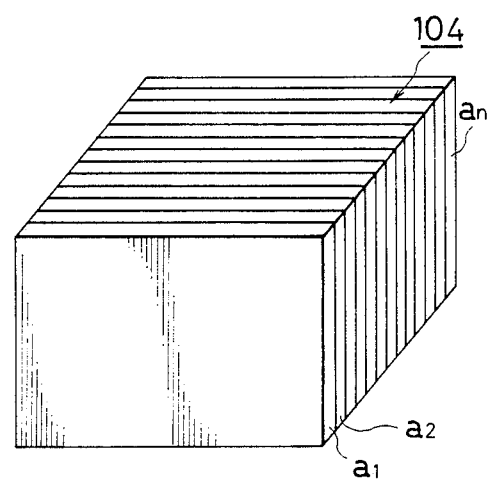
Figure 26:
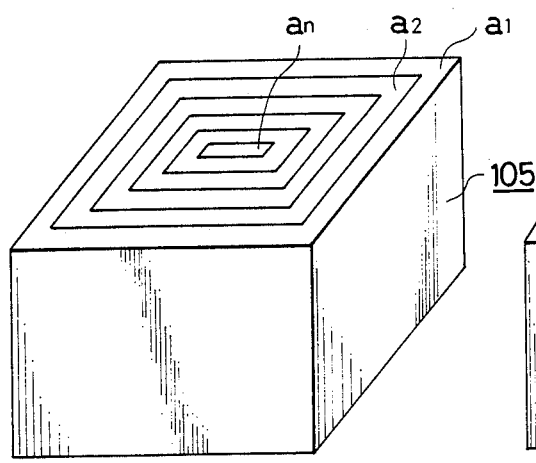

(A-2) Multilayered structure which is made of the only slightly vulcanized rubber of different kinds (in rubber type, compounding, and degree of crosslinking). The multiple layers may be arranged vertically, horizontally, or coaxially. The multilayered structure also includes the macroscopic uneven dispersion of rubber components of different kinds. With this structure, the damper can exhibit any desired performance (such as elastic modulus, failure characteristics, and hysteresis). Examples of this structure are shown in FIGS. 24 to 26. The dampers 103, 104, and 105 shown in these figures are made up of layers $a_1, a_2, \ldots a_n$ arranged horizontally, vertically, or coaxially. The individual layers are made of the only slightly vulcanized rubber which varies in type of rubber, compounding, and degree of crosslinking.

(A-3) Composite structure which is made of the only slightly vulcanized rubber and highly vulcanized rubber. In this structure, the outside or inside of the only slightly vulcanized rubber is partly provided with "highly vulcanized rubber" (formed according to the average formulation shown in Table 1).

Figure 27:
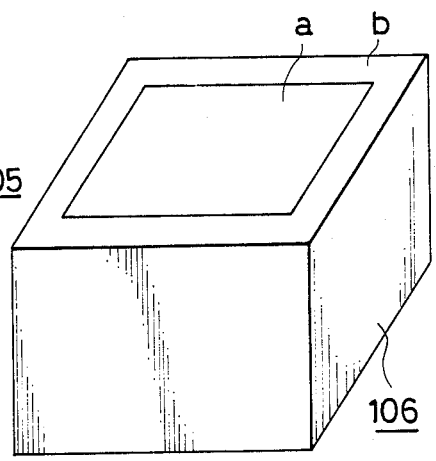
Figure 28:
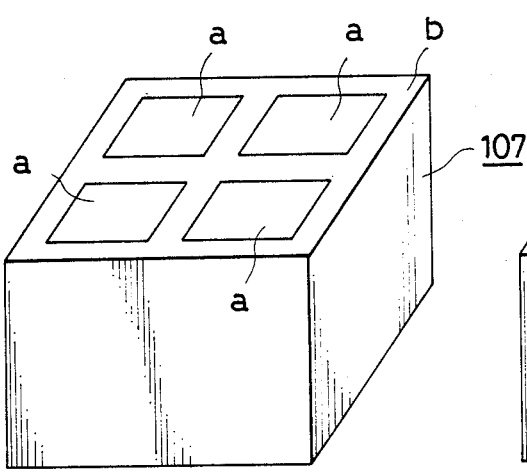

In the example shown in FIG. 27, the damper 106 is made up of the only slightly vulcanized rubber a (forming a core) and the highly vulcanized rubber b (forming a cover thereon). In the example shown in FIG. 28, the damper 107 is made up of the highly vulcanized rubber b (forming a lattice frame) and the only slightly vulcanized rubber a (filling the space of the lattice frame). In another example, the only slightly vulcanized rubber may container the highly vulcanized rubber dispersed therein.

The highly vulcanized rubber used for this structure may be incorporated with additives such as filler, tackifier, slip agent, antioxidant, plasticizer, softener, low-molecular weight polymer, and oil which are commonly used for rubber processing. Furthermore, the highly vulcanized rubber may be used in combination with hard materials (mentioned in (B) later) to form a laminate structure.

Figure 29:
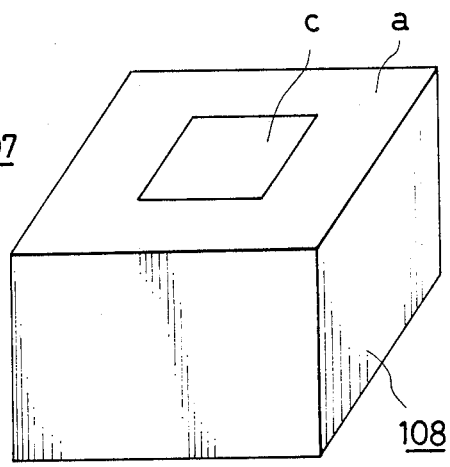

(A-4) Composite structure which is made of the only slightly vulcanized rubber and unvulcanized rubber. Unvulcanized rubber can be partly used as supplement although it cannot be used as the principal constituent in this invention as mentioned above. An embodiment of this structure may be made up of the only slightly vulcanized rubber and unvulcanized rubber dispersed therein. (In this case, the unvulcanized rubber may be replaced by the above-mentioned plasticizer, softener, tackifier, oligomer, or slip agent.) In an example shown in FIG. 29, the damper 108 is made up of the only slightly vulcanized rubber a and the unvulcanized rubber c enclosed therein.

Figure 30:
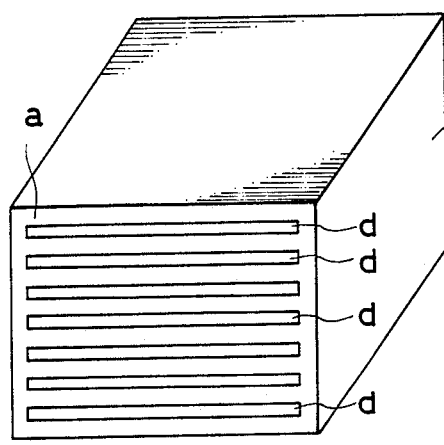
Figure 31:
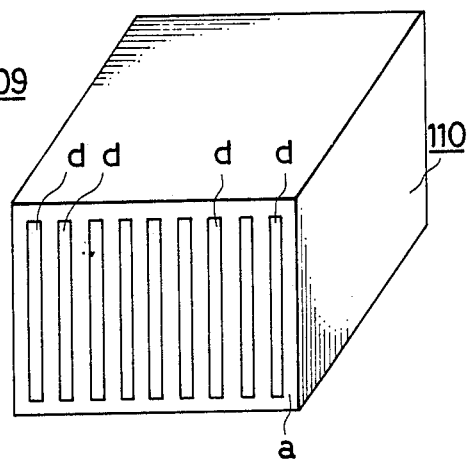
Figure 32:
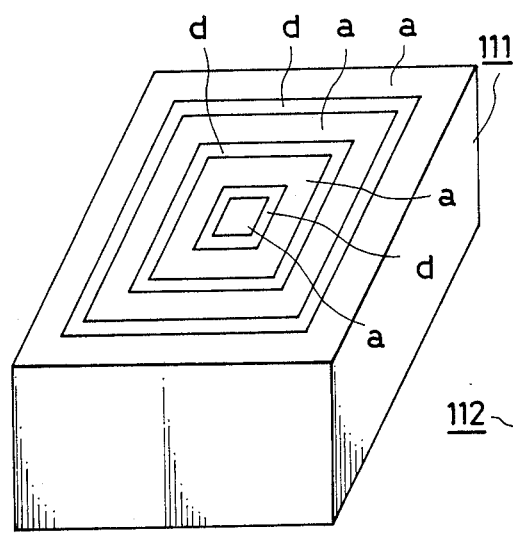

The composite structure (B) includes those which are formed by combining the structure (A-1), (A-2), (A-3), or (A-4) with a hard material. In the dampers 109, 110, and 111 of composite structure shown in FIGS. 30 and 31, the layers of the only slightly vulcanized rubber a and the layers of hard material d are laminated horizontally or vertically on top of the other or arranged alternately coaxially. The hard material, which is not specifically limited, includes, for example, metal, ceramics, glass, FRP, plastics, polyurethane, hard rubber, wood, rock, sand, and leather. The hard material may be in the plate, reticulated, corrugated, honeycomb, or woven form.

Figure 33:
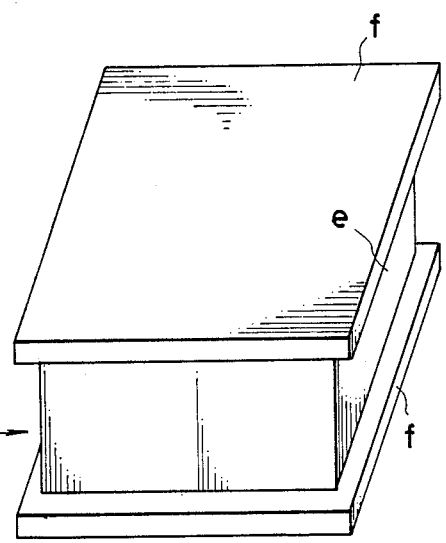

The composite unit (C) is shown in FIG. 33. The damper 12 in this example is made up the body e of structure (A) or (B) and the hard plates f bonded to the top and bottom thereof. In actual application, one or more units of the damper 12 are arranged horizontally or vertically. Where two or more units are used, they may be of the same or different type and structure. The hard plates used in this structure include those of metal, ceramics, FRP, plastics, glass, wood, paper, polyurethane, and hard rubber.

Figure 34:
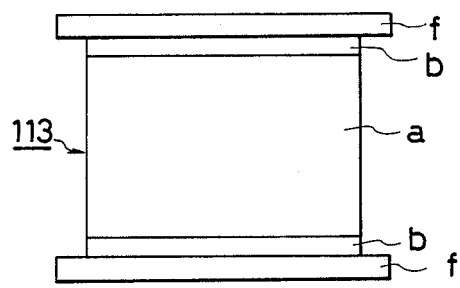

In the case of the structure containing hard plates, the damper 113 shown in FIG. 34 is provided with a layer of highly vulcanized rubber b (of the same of different kind) to increase the bond strength between the only slightly vulcanized rubber and the hard plate. This layer may be replaced by a proper adhesive.

The anti-seismic device of the present invention is composed of dampers and anti-seismic rubber bearings arranged in parallel. The damper is constructed mainly of a viscoelastic material as mentioned above, and the anti-seismic rubber bearing is composed of rigid hard plates and viscoelastic soft boards laminated alternately one over the other.

The damper constituting the anti-seismic device of the present invention is not specifically limited in shape so long as it has a shape which produces the damping effect upon shear deformation or flexural deformation. In general, a cylindrical shape is desirable.

In the present invention, the dampers are used in combination with the anti-seismic rubber bearings. They may be arranged in parallel between a building and a foundation. Alternatively, the damper may be placed in a cylindrical space formed at the core of the anti-seismic rubber bearing.

The anti-seismic rubber bearing constituting the anti-seismic device of the present invention is composed of hard plates and soft boards. The hard plates may be made of metal, ceramics, plastics, FRP, polyurethane, wood, paper board, slate, and decorative laminate. The soft boards may be made of vulcanized rubber, unvulcanized rubber, plastics, rubber or plastics foam, asphalt, clay, and mixtures thereof. The hard plate and soft board may have a shape of circle, square, pentagon, hexagon, or polygon.

The anti-seismic rubber bearing may be covered with a weather-resistant covering rubber for the improvement of weather resistance as mentioned above.

The anti-seismic device of the present invention constructed as mentioned above produces both the anti-seismic effect and damping effect, thereby absorbing and reducing the earthquake motion that is transmitted to the building at the time of earthquake.

The examples of the invention are now described with reference to the drawings.

First, an example of the damper used in the invention will be explained.

Figure 1:
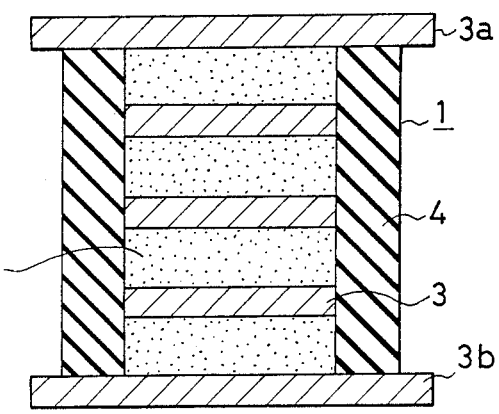
FIGS. 1 to 4 are longitudinal sectional views of the dampers pertaining to the present invention.

FIG. 1 is a longitudinal sectional view of the damper 1 pertaining to the above-mentioned embodiment 1. This damper 1 is composed of rigid hard plates 3 and soft layers of viscoelastic material 2 which are laminated alternately. The hard plates are steel plates or the like, and the viscoelastic material has the above-mentioned characteristic properties (i) and (ii). The damper is covered with the covering rubber 4 of vulcanized rubber. The hard plates 3a and 3b positioned at the top and bottom of the damper function also as the flanges.

The laminate structure just mentioned above produces a pronounced damping effect because the soft layers undergo the maximum deformation (shear deformation) when the damper receives vibration. Because of this damping effect, the damper of the invention is much smaller in size than the conventional oil-type viscous damper.

In designing the damper 1 of this example, it is possible to select any shape, volume ratio, and number of layers for the soft layers of viscoelastic material 2 and the hard plates 3, according to the spring constant and damping effect required under actual use conditions. The damper in the simplest structure is composed of two hard plates and one soft layer interposed between them.

The thickness of the covering layer 4 is properly selected according to the size and object of the damper. Usually it is greater than 1 mm and smaller than 100 mm.

The material for the hard plates 3 may be selected from metal, ceramics, plastics, FRP, polyurethane, wood, paper board, slate, and decorative laminate.

Figure 2:
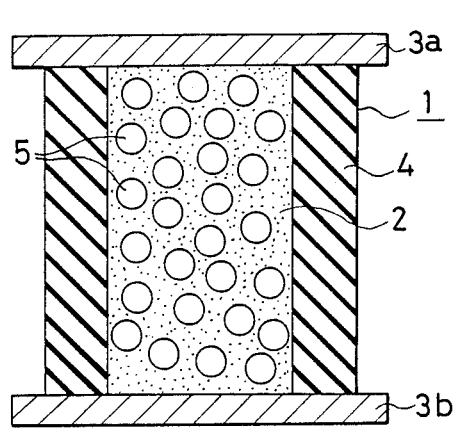
Figure 3:
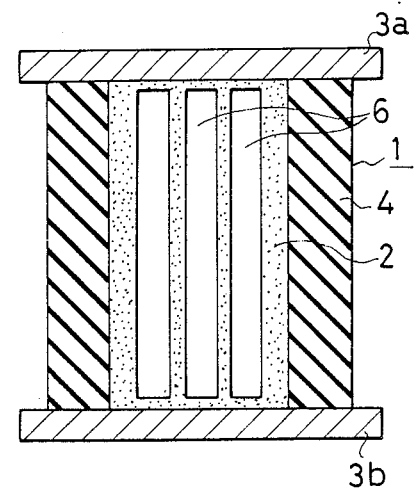

FIGS. 2 and 3 are longitudinal sectional views of the damper 1 pertaining to the above-mentioned embodiment 2. This damper 1 is composed of a soft body of viscoelastic material 2 and spherical bodies 5 or cylindrical bodies 6 of solid substance embedded in said soft body. The soft body is covered with the vulcanized rubber 4 and is held between the flanges 3a and 3b.

The solid material embedded in the damper permits the viscoelastic material 2 to greatly deform, providing the good damping effect.

Figure 4:
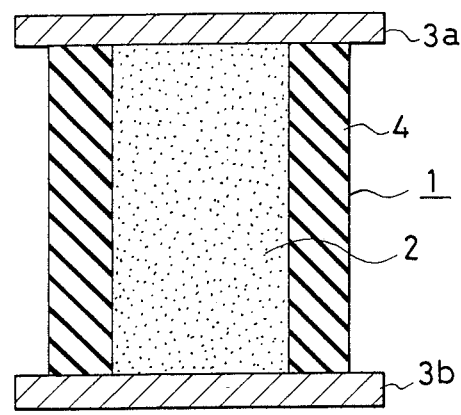

FIG. 4 is a longitudinal sectional view of the damper 1 pertaining to the above-mentioned embodiment 3. This damper is composed of the soft body and the vulcanized rubber 4 covering it. The soft body is made of a viscoelastic material 2 alone and is held between the flanges 3a and 3b.

In the example shown in FIG. 2, the spherical body 5 is not necessarily required to be truly spherical, nor is it required to be uniform in size. Rather, a proper size distribution may be desirable.

The diameter (or average diameter) D of the spherical body 5 may vary depending on the size of the damper and the quality of the spherical body 5 and viscoelastic material 2. It is in the range of $0.1 \leq D \leq 10$ (mm), and preferably $1 \leq D \leq 10$ (mm).

The amount of the spherical bodies 5 should be such that the following relationship is established.

$$0.5 \leq \frac{V_R}{V_R - V_L} \leq 0.9 \text{ and preferably}$$

$$0.5 \leq \frac{V_R}{V_R - V_L} \leq 0.8$$

where $V_L$ is the volume of the viscoelastic material 2 and $V_R$ is the volume of the spherical bodies 5.

The solid substance may be the columnar body 6 having a round section as shown in FIG. 3. In addition, the solid substance may have a shape of spheroid or flat spheroid.

The spherical bodies 5 and columnar bodies 6 should be uniformly dispersed in the soft body. They may be hollow for the adjustment of specific gravity.

The solid substance may also be something like a wall which increases the area of contact with the viscoelastic material. In other words, it may be a partitioning member which separates the soft body into cells.

The preferred partitioning member is one which forms vertically elongated cells in the soft body of the damper as shown in FIGS. 6(a) to 6(e). FIGS. 6(a) to 6(e) are perspective views showing the partitioning members 8. The one shown in (a) is concentric, the one shown in (b) is radial, the one shown in (c) is a combination of the ones shown in (a) and (b), the one shown in (d) is cylindrical, and the one shown in (e) is spiral. The outermost cylinder in FIGS. 6(a) to 6(e) shows the internal wall (vulcanized rubber) of the damper.

The partitioning member may also be of honycomb structure. Such a structure should preferably be symmetrical with respect to the center axis of the soft body so that the stress is uniformly distributed at the time of earthquake.

The partitioning member shown in FIGS. 6(a) to 6(e) should preferably be fixed to the damper or flange; however, it is not always necessary that the edge that comes into contact with the flange and the edge that comes into contact with the internal wall of the vulcanized rubber of the damper be all fixed. For example, in the case of the one shown in FIG. 6, some of the partitioning members are fixed at the upper end alone and others are fixed at the lower end alone.

The solid substance from which the spherical bodies, columnar bodies, and cell partitioning members are made is not specifically limited. It includes, for example, metal, ceramics, glass, FRP, plastics, polyurethane, hard rubber, wood, rock, sand, and pebbles. In addition, the partitioning member may be made of rubber, paper, and leather having a comparatively low hardness.

Examples of the rubber material include vulcanized rubber exemplified above as the viscoelastic material. Preferred examples of the plastics include thermoplastic resins such as polystyrene, polyethylene, polypropylene, ABS, polyvinyl chloride, polymethyl methacrylate, polycarbonate, polyacetal, nylon, polyether chloride, polytetrafluoroethylene, acetyl cellulose, and ethyl cellulose; and thermosetting plastics such as phenolic resin, urea resin, unsaturated polyester resin, epoxy resin, alkyd resin, and melamine resin.

Preferred examples of the FRP may be filler- or fiber-reinforced rubber or plastics.

It is not always necessary that the solid substance is made of a single material; but it may be formed by the combination of the above-mentioned materials. Examples are a combination of metal and rubber and a combination of plastics and rubber.

The damper as shown in FIG. 1 may be produced by bonding with an adhesive the covering rubber 4, which has previously been vulcanized in the plate or film form, to the external surface of the laminate body composed of soft layers and hard plates. According to a preferred method, it is produced by bonding the covering rubber 4 in unvulcanized state to the external surface of the laminate body composed of soft layers and hard plate, and subsequently performing vulcanization, thereby bonding and integrating the covering rubber 4.

In this case, the vulcanization may be accomplished by heating in the usual way or by using electron rays, radiation, or ultrasonic wave. Low-temperature vulcanization can also be used.

In the case where sufficient adhesion or bonding is not made between the inner viscoelastic material and the covering rubber by the vulcanization bonding, an additional rubber layer which exhibits good adhesion to both of them may be interposed between them. In addition, for the improvement of adhesion, the internal viscoelastic material and/or covering rubber may be incorporated with an additive.

Figure 8:
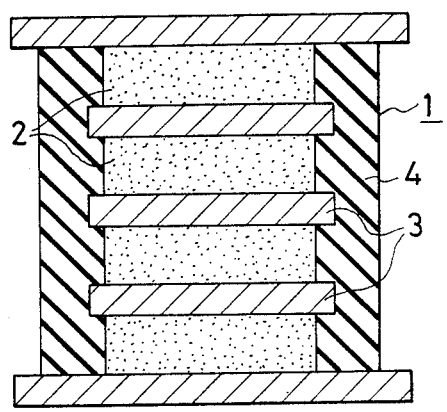
FIG. 8 is a longitudinal sectional view of a damper in one embodiment of the invention.

The vulcanized rubber 4 for covering is usually placed outside the laminate body composed of soft layers of viscoelastic material 2 and hard plates 3, as shown in FIG. 1. However, for the increased bonding between the covering rubber and the hard plate or for other manufacturing reasons, the edges of the hard plate 3 may project into the covering layer 4 as shown in FIG. 8.

The damper as shown in FIGS. 2 to 4 may also be produced in the same manner as mentioned above. In this case, it is desirable that a special pack be made in which the viscoelastic material and solid substance are enclosed and it be then inserted into the main body (covering rubber) of vulcanized rubber which has been separately prepared.

Figure 7:
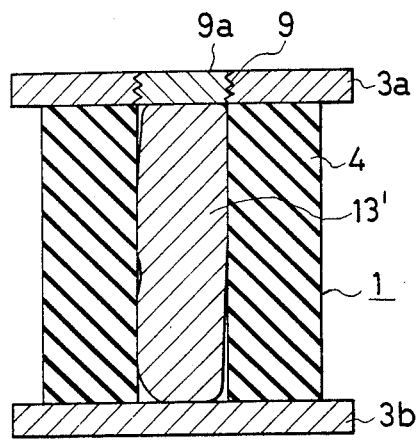
FIG. 7 is a longitudinal sectional view illustrating how to make the damper pertaining to the present invention.

According to another method of production, a pack 13' in which are enclosed the viscoelastic material and solid substance is inserted into the main body 4 of vulcanized rubber through a hole 9 made in the flange 3a as shown in FIG. 7. After insertion, the hole is closed with a threaded stopper 9a which is screwed into the threaded hole 9. The pack may be fixed to the inside wall of the vulcanized rubber 4 and the flanges 3a and 3b, or may be simply inserted.

The material from which the pack 13' is made is not specifically limited. It includes, for example, rubber, polyurethane, plastics, FRP, paper, leather, and metal plate. Rubber, plastics, and FRP may be selected from those which are exemplified above for the solid substance.

It is not always necessary that the pack 13' be made of a single material; but it may be formed by the combination of the above-mentioned materials. Examples are a combination of metal and rubber and a combination of plastics and rubber.

In the case where the main body of the damper and the pack are produced independently from each other, the production is much easier and the production cost is much lower than in the case where they are produced as an integral body. In the former case, it is possible to replace the pack alone or the vulcanized rubber alone.

Figure 9:
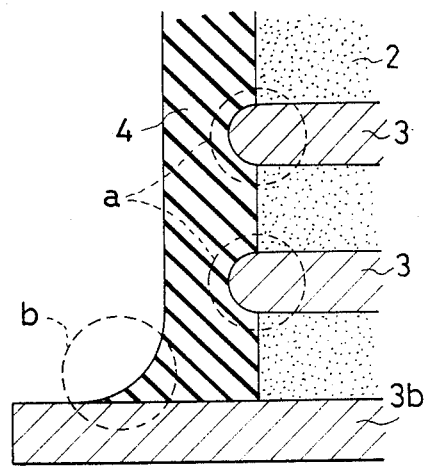
FIG. 9 is a partly enlarged longitudinal sectional view showing the flange and its vicinity in another embodiment of the invention.

If the damper of the present invention is used under the conditions that cause considerable deformation, a great local strain would occur in that part of the soft layer and covering layer that is in contact with the edge of the hard plate (shown in FIG. 1). This local strain might lead to the breakage of the structure. To prevent this possible trouble, the hard plate 3 may be provided with a round edge (a) which projects into the covering vulcanized rubber 4, as shown in FIG. 9. In addition, the corner (b) formed by the covering vulcanized rubber 4 and the flange 3b may be filleted as shown in FIG. 9.

The damper of the present invention may be composed of at least one skeleton of reticulated structure, corrugated structure, honeycomb structure, or woven stuff and the viscoelastic material. In this case, the material from which the skeleton is made is not specifically limited. It includes, for example, metal, ceramics, plastics, FRP, polyurethane, natural fiber (cotton and silk), and synthetic fiber (polyamide and polyester).

The combination of the viscoelastic material with the skeleton as in the above-mentioned embodiment 4 gives an extremely high damping coefficient to the damper of the present invention.

Figure 10:
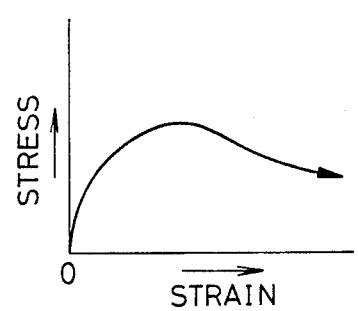
FIG. 10 is a graph showing a stress-strain curve of a viscoelastic material.
Figure 11:
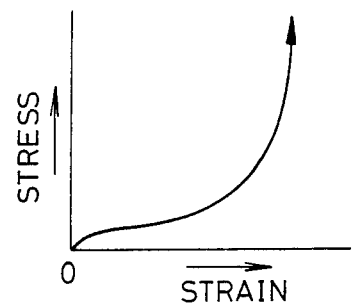
FIG. 11 is a graph showing a stress-strain curve of a skeleton.

The viscous viscoelastic material produces the stress-strain curve as shown in FIG. 10. Thus it absorbs stress when deformation is small; but it decreases in stiffness and hence does not have sufficient strength when deformation is large. By contrast, the reticulated structure, corrugated structure, honeycomb structure, and woven stuff produce the stress-strain curve as shown in FIG. 11. Thus they exhibit high stiffness when deformation is large.

The damper of combination structure, therefore, produces a good damping effect while keeping a high stiffness over a broad range from small deformation to large deformation.

In the case of the damper of this structure, the skeleton should be arranged such that the direction in which the skeleton deforms most easily is horizontal. For example, the skeleton of reticulated structure should preferably be arranged such that one diagonal line of each opening is horizontal.

The anti-seismic device of the invention will be described with reference to examples that follow.

Figure 12:
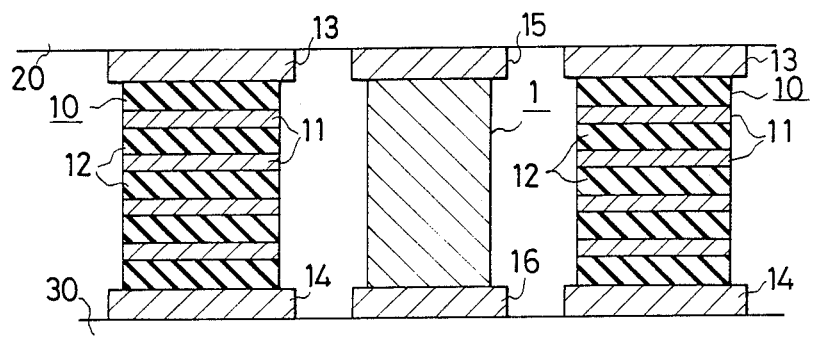
FIG. 12 is a longitudinal sectional view of the anti-seismic device pertaining to an embodiment of the invention.
Figure 13:
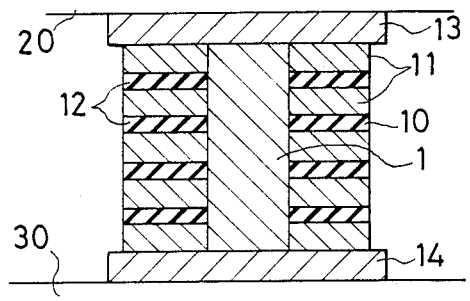
FIG. 13 is a longitudinal sectional view of the anti-seismic device pertaining to another embodiment of the invention.

FIG. 12 and FIG. 13 are respective longitudinal sectional views of the anti-seismic devices pertaining to the examples of the present invention.

The anti-seismic device shown in FIG. 12 is composed of the anti-seismic rubber bearings 10 and the dampers 1 arranged in parallel. The anti-seismic rubber bearing 10 is composed of a plurality of rigid hard plates 11 and soft layers 12 having the viscoelastic property laminated one over another. The damper 1 is as described above. In FIG. 12, there are shown flanges at 13–16, a building at 20, and a foundation at 30.

The anti-seismic device shown in FIG. 13 is of such a structure that the damper 1 is placed in the cylindrical space formed at the core of the anti-seismic rubber bearing 10. (In FIGS. 12 and 13, like reference numerals designate corresponding parts.)

Figure 36:
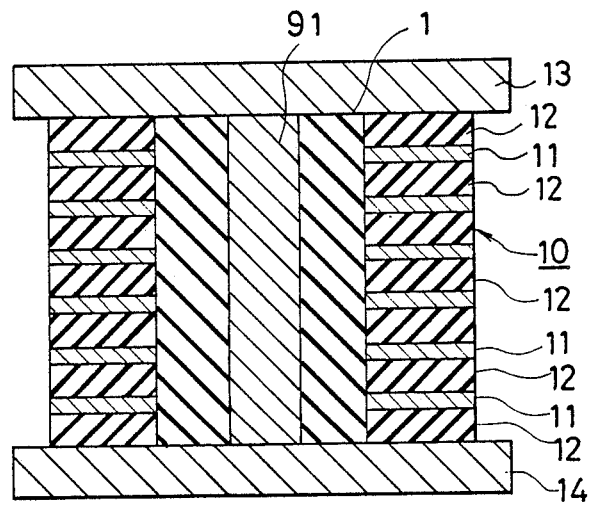
FIGS. 36 and 37 are sectional views showing another embodiment of the anti-seismic device.
Figure 37:
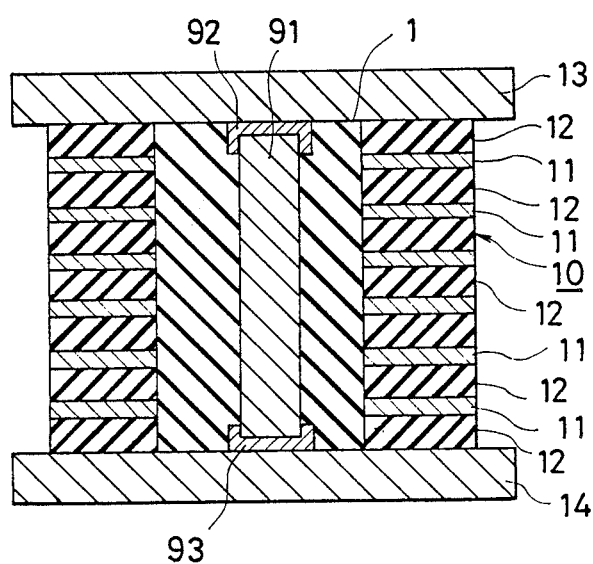

Other embodiments relating to that shown in FIG. 13 are shown in FIGS. 36 and 37. The embodiment shown in FIG. 36 is a modification of the embodiment shown in FIG. 13. The modification is made by making a through hole at the center of the damper 1 shown in FIG. 13 and filling it with an elastoplastic body 91, a preferred example of which is lead. The embodiment shown in FIG. 37 is a modification of the embodiment shown in FIG. 36. The modification is made by providing the flanges 13 and 14 with fasteners 92 and 93. The fastener 92 is open downward and the fastener 93 is open upward, so that they hold the upper and lower ends of the elastoplastic body 91.

In the case of the anti-seismic device as shown in FIG. 13, the surrounding vulcanized rubber for the anti-seismic rubber bearing functions as the covering rubber; therefore, it is not always necessary that the damper 1 be of such a structure that the soft body of viscoelastic material is covered with vulcanized rubber. In the case where the top and bottom of the viscoelastic material are covered with thick flanges 3a and 3b, respectively, as shown in FIGS. 1 to 4, it is not always necessary that the top and bottom of the damper be fixed to the building and foundation, respectively, with additional hard plates (such as steel plates) interposed between them.

In the case of the anti-seismic device shown in FIG. 12, the number of the anti-seismic rubber bearings 10 and dampers 1 and the intervals of their arrangement may be properly determined according to the object of using the anti-seismic device. In the case of the anti-seismic device shown in FIG. 13, the ratio of the sectional area of the anti-seismic rubber bearing 10 to the sectional area of the damper 1 may be properly determined according to the object of using the anti-seismic device.

The above-mentioned anti-seismic device of the present invention as shown in FIG. 12 is formed by arranging the anti-seismic rubber bearings 10 and the dampers 1 in parallel. The anti-seismic rubber bearing is produced by laminating hard plates and soft layers one over another and bonding them together with an adhesive or by covulcanization.

The anti-seismic device as shown in FIG. 13 is produced in the following manner. At first, the anti-seismic rubber bearing 10 is formed by vulcanization, with the core left void. Subsequently, the previously molded damper 1 is inserted into the core void, or hard plates and soft layers are placed in the core void alternately and the resulting assembly is subjected to covulcanization.

The anti-seismic device having a built-in damper as shown in FIG. 13 exhibits good damping characteristics over a broad range of small deformation to large deformation; however, there is an instance where it produces only a little damping effect for very small vibration.

The anti-seismic rubber bearing, with its core filled with a damper of viscoelastic material having good hysteresis characteristics, provides an extremely high damping factor over a broad range of small deformation to large deformation. If the specific viscoelastic material is to exhibit a high damping capacity, it will have a higher elastic modulus than the surrounding anti-seismic rubber bearing in the range of extremely small deformation. Needless to say, the ratio of increase is by far smaller than that of lead or steel plastic bodies. In any way, high moduli are generally inevitable where the high loss characteristics are required.

In the present industrial society, the countermeasure for microvibrations is required by IC plants, biotechnology plants, and laser plants where accurate processing is necessary and also by houses along a railway line or a motorway. The ordinary anti-seismic rubber bearings are effective against microvibrations and produce good damping effect because they have a low modulus in the lateral direction. By contrast, the anti-seismic rubber bearing containing a viscoelastic material has a higher modulus than the ordinary anti-seismic rubber bearing without the viscoelastic material, because the viscoelastic material has a high modulus for small deformation. Therefore, the anti-seismic rubber bearing containing a viscoelastic material tends to be poor in damping effect for microvibrations and hence does not meet the present requirement.

Figure 14:
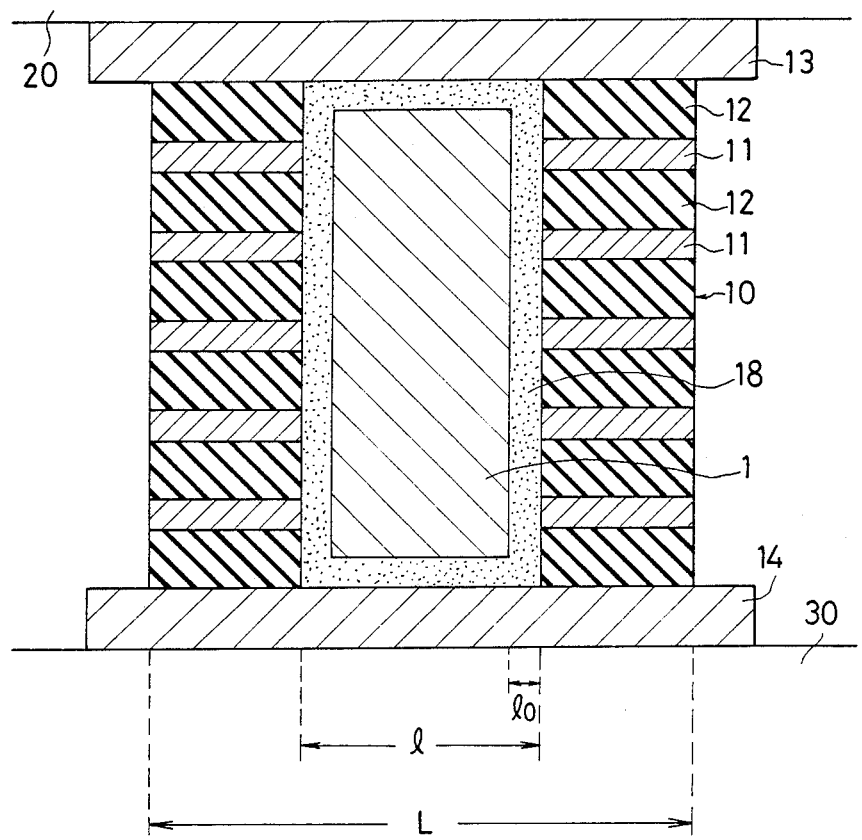
FIG. 14 is a longitudinal sectional view of the anti-seismic device pertaining to further another embodiment of the invention.

In order that the damper does not prevent the damping action of the anti-seismic rubber for microvibrations, the anti-seismic device of the present invention should preferably have a structure as shown in FIG. 14.

The anti-seismic device as shown in FIG. 14 is composed of the anti-seismic rubber bearing 10 and the damper 1, with the space between them filled with a material 18 less resilient than the damper. The anti-seismic rubber bearing 10 is composed of a plurality of rigid hard plates 11 and soft layers 12 having the viscoelastic property placed one over another. The damper 1 is made mainly of a viscoelastic material. The damper 1 is placed in the space formed at the core of the anti-seismic rubber bearing 10. In FIG. 14, there are shown flanges at 13 and 14, a building at 20, and a foundation at 30.

The low-resilience material 18 should be one which satisfies the following condition.

$$\frac{E_L}{E_V} \leq 0.9$$

$$\text{preferably } \frac{E_L}{E_V} \leq 0.7$$

$$\text{more preferably } \frac{E_L}{E_V} \leq 0.5$$

where $E_L$ is a storage modulus of the low-resilience material 18 and $E_V$ is a storage modulus of the viscoelastic material of the damper 1, both measured dynamically at 25° C., at a frequency of 5 Hz, and at a strain of 0.01%.

The low-resilience material 18 is not specifically limited so long at it satisfies the above-mentioned requirements. It may be made of a variety of rubbers and plastics and some of the above-mentioned viscoelastic materials. It may also be a spring of foam, metal, plastics, and rubber; blanket, woven stuff, and straw waste. The layer of the low-resilience material may has a space therein, according to need.

In addition, it is not always necessary that the low-resilience material 18 cover the side, top, and bottom of the damper 3. An embodiment may be possible in which the side alone is covered. It is desirable that the low-resilience material 18 be placed in the void between the damper 1 and the rubber laminate 10, as shown in FIG. 14. However, it is not always necessary to fill the void completely, and there may be some parts which are not filled with the low-resilience material.

In the anti-seismic device as shown in FIG. 14, there is no limitation in the shape of the anti-seismic rubber bearing, the size of the damper 1, and the thickness of the low-resilience material 18. They may be properly selected according to the object of using the anti-seismic device. For example, the anti-seismic rubber bearing 10 should preferably have a size which is defined as follows:

$$\frac{l}{L} \leq 0.80$$

preferably $\frac{l}{L} \leq 0.70$ more preferably $\frac{l}{L} \leq 0.64$ where l is the diameter of the void in the anti-seismic rubber bearing 10, and L is the diameter of the anti-seismic rubber bearing 10. Also, the low-resilience material 18 should preferably have a size which is defined as follows:

$$\frac{l_0}{l} \leq 0.1$$

preferably $\frac{l_0}{l} \leq 0.05$ where $l_0$ is the thickness of the low-resilience material 18, and l is the diameter of the void of the anti-seismic rubber bearing 10.

The anti-seismic device just mentioned above may be produced by laminating hard plates and soft layers one over another and vulcanizing the assembly, with the core left void, and then inserting the previously made damper and low-resilience material into the void. According to another method, hard plates and soft layers, each having a hole at the center, are placed one over another around the previously formed damper and low-resilience material, and the resulting assembly is subjected to covulcanization.

The anti-seismic devices as shown in FIGS. 15 to 18 are composed of the anti-seismic rubber bearing 10 and the damper 1 placed in the center void thereof, with a space or an air-containing layer interposed between them. The anti-seismic rubber bearing 10 is composed of a plurality of rigid plates 11 and a plurality of soft layers 12 having the viscoelastic property placed one over another. The damper is made mainly of a viscoelastic material. The space or air-containing layer reduces to an extreme extent the amount of elastic deformation to be transmitted to the anti-seismic rubber bearing 10 when the damper 1 undergoes elastic deformation. Thus it enhances the damping action for microvibrations of the device.

Figure 15:
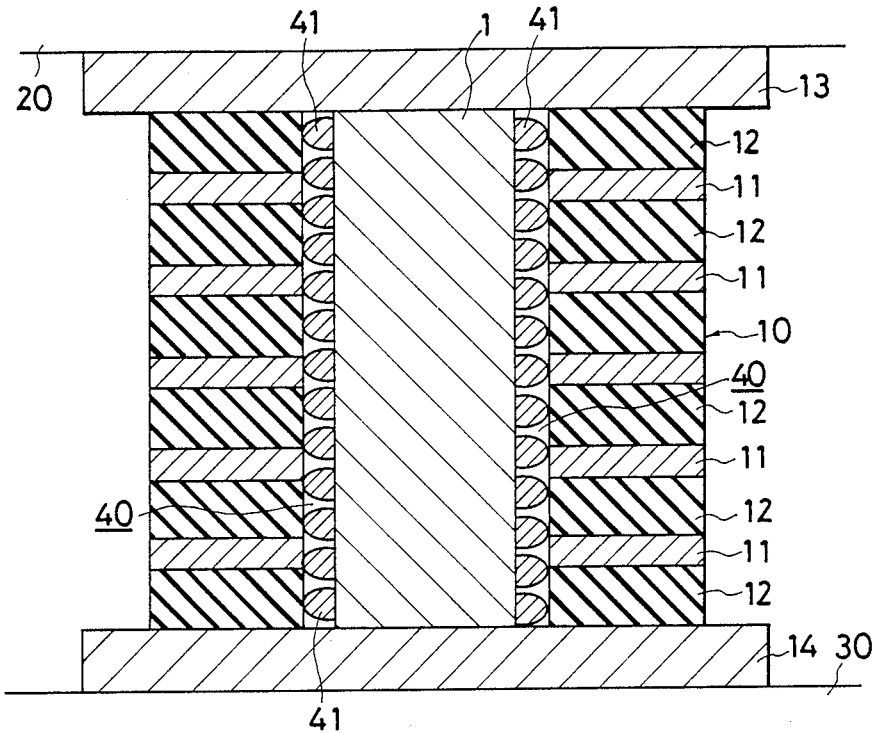
FIGS. 15 to 18 are longitudinal sectional views showing the anti-seismic device of the invention.
Figure 16:
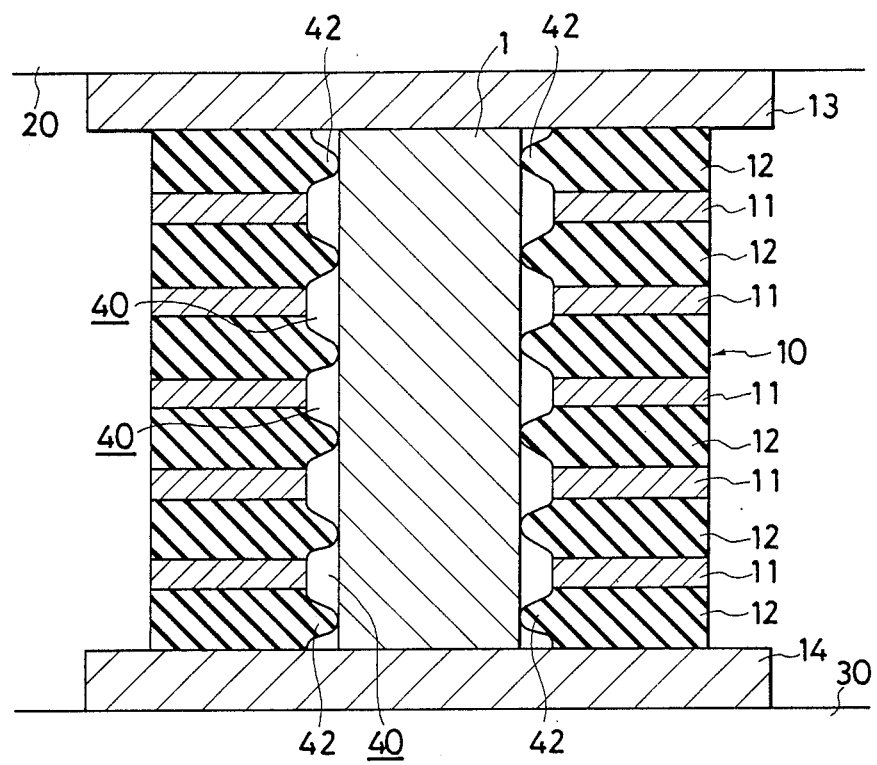
Figure 17:
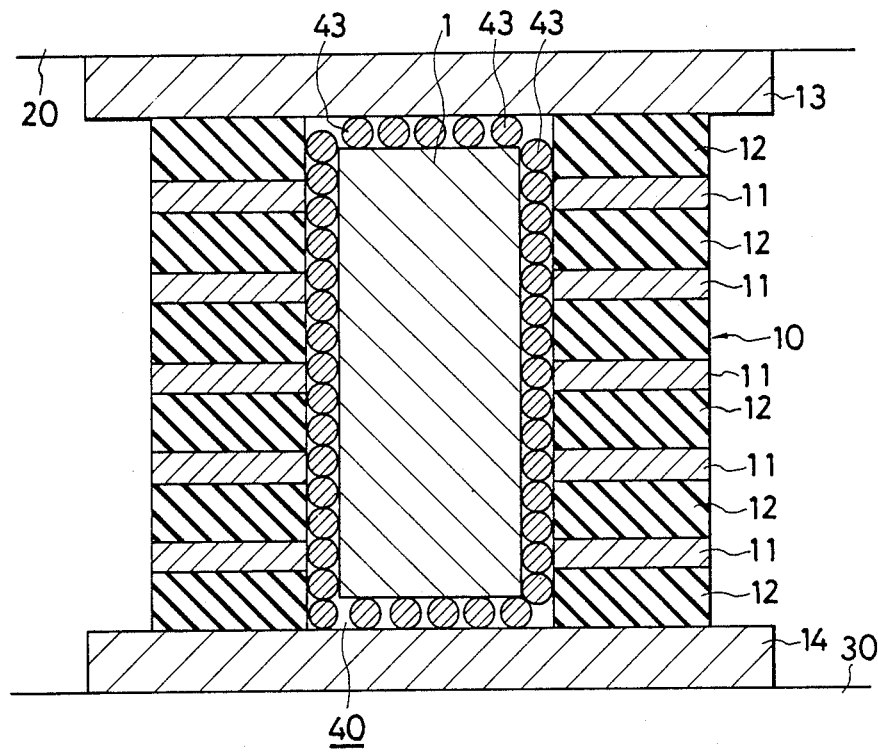
Figure 18:
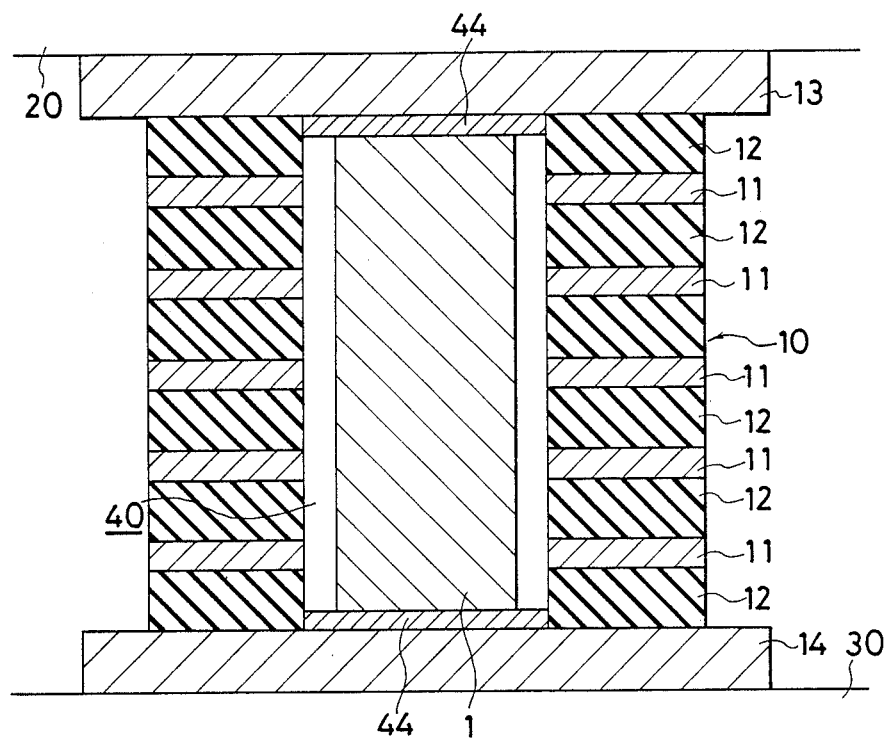

In the anti-seismic device shown in FIG. 15, the space 40 between the damper 1 and the bearing 10 is formed by a long member 41 (such as wire and rope) wound round the damper 1. In the anti-seismic device shown in FIG. 16, the space 40 is formed by the projecting parts 42 of the soft plates 12, said projecting parts jutting inward the center void from the inside wall of the bearing 10. In the anti-seismic device shown in FIG. 17, the space 40 is formed by spherical bodies 43 arranged around the damper 1. In the anti-seismic device shown in FIG. 18, the space 40 is formed by sliding plates 44 attached to the top and bottom of the damper 1.

Figure 19:
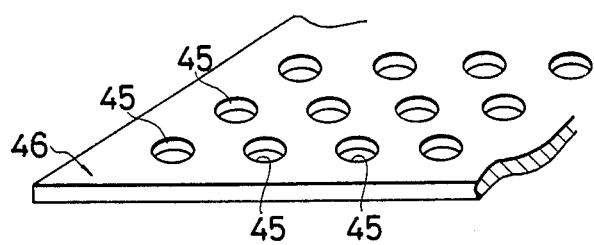
FIGS. 19 to 21 are perspective views showing the material to be arranged around the damper.
Figure 20:
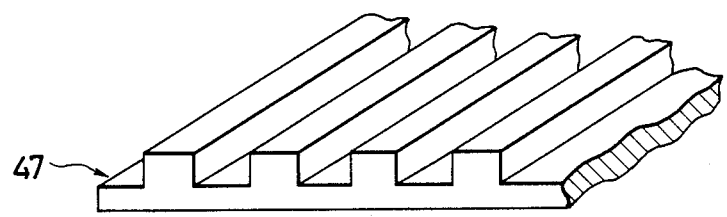
Figure 21:
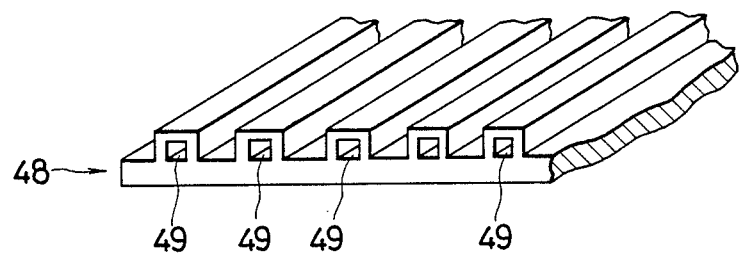

The above-mentioned long member 41 and spherical body 43 may be replaced by a net, closed-cell foam, sheet having openings 45 as shown in FIG. 19, and sheets 47 and 48 having ridges (or hollow ridges 49) and grooves as shown in FIGS. 20 and 21. The material to be arranged around the damper 1 should have a smaller compression modulus of elasticity per unit area in contact with the damper than that of the damper. The material should preferably be unvulcanized rubber, vulcanized rubber, polymer, fiber reinforced plastics, asphalt, clay, natural fiber, and metal. Preferable among them are vulcanized rubber and plastics.

As mentioned above, the damper used in the anti-seismic device of the present invention is constructed mainly of a viscoelastic material having a specific property. Consequently, it has the following advantages over the conventional viscous damper which employs oil.

(1) It is possible to select the temperature dependence and rate dependence of the hysteresis loss characteristics according to the properties of the individual rubber materials.

(2) Easy molding.
(3) Easy handling and easy execution.
(4) Easy maintenance.
(5) Low cost.
(6) High damping effect and small size.

The damper used for the anti-seismic device of the present invention does not have the disadvantage of the plastic damper but has much better characteristic properties than the conventional viscous damper. Therefore, it is of great industrial use.

The anti-seismic device of the present invention is composed of the dampers and the anti-seismic rubber bearings which are formed by laminating alternately a plurality of rigid hard plates and soft layers having viscoelastic properties. Therefore, the anti-seismic device produces both the anti-seismic effect and the damping effect and absorbs much of shaking at the time of earthquake, isolating the building from earthquake motion. Thus it prevents the building from crashing against other structures and also prevents the utilities such as water pipe, gas pipe, and wiring from damage at the time of earthquake.

In addition, it is expected that the anti-seismic device of the present invention produces the pronounced effect of removing, preventing, and suppressing vibrations.

The present invention differs from that disclosed in U.S. Pat. No. 4,566,231 relating to a vibration damping stiffener which produces a marked damping effect in the high-frequency region but produces almost no damping effect in the low-frequency region necessary for the anti-seismic structure. This is apparent from the experiment mentioned below.

Figure 38:
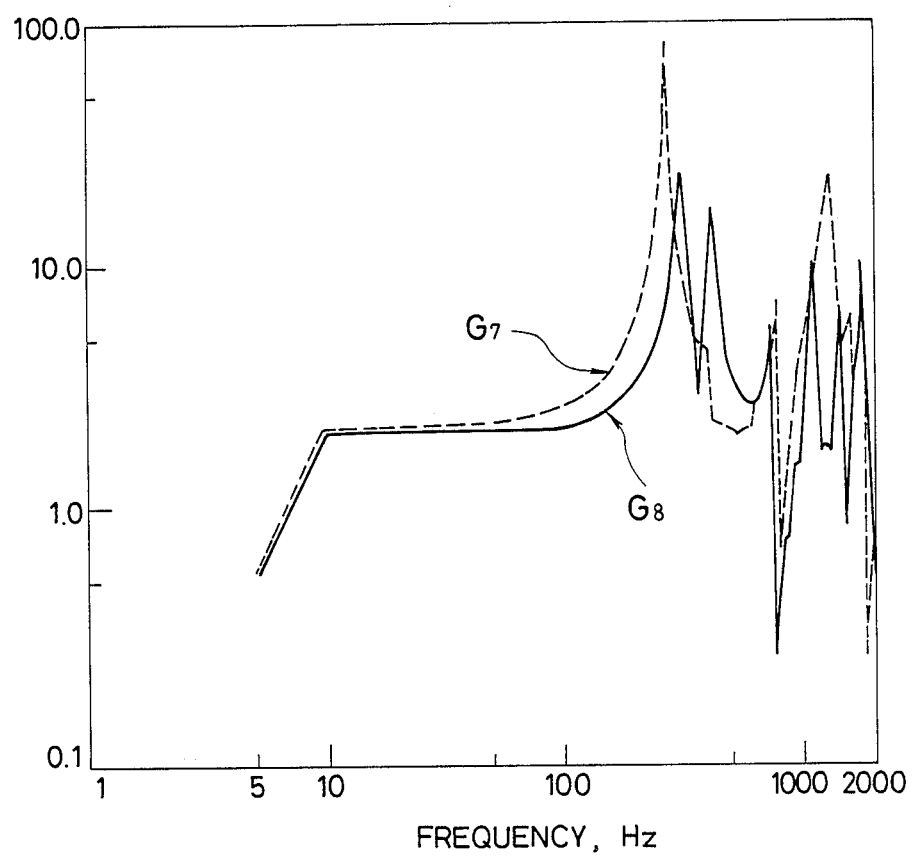
FIGS. 38 and 39 are diagrams showing the characteristic properties of the conventional damping stiffener.
Figure 39:
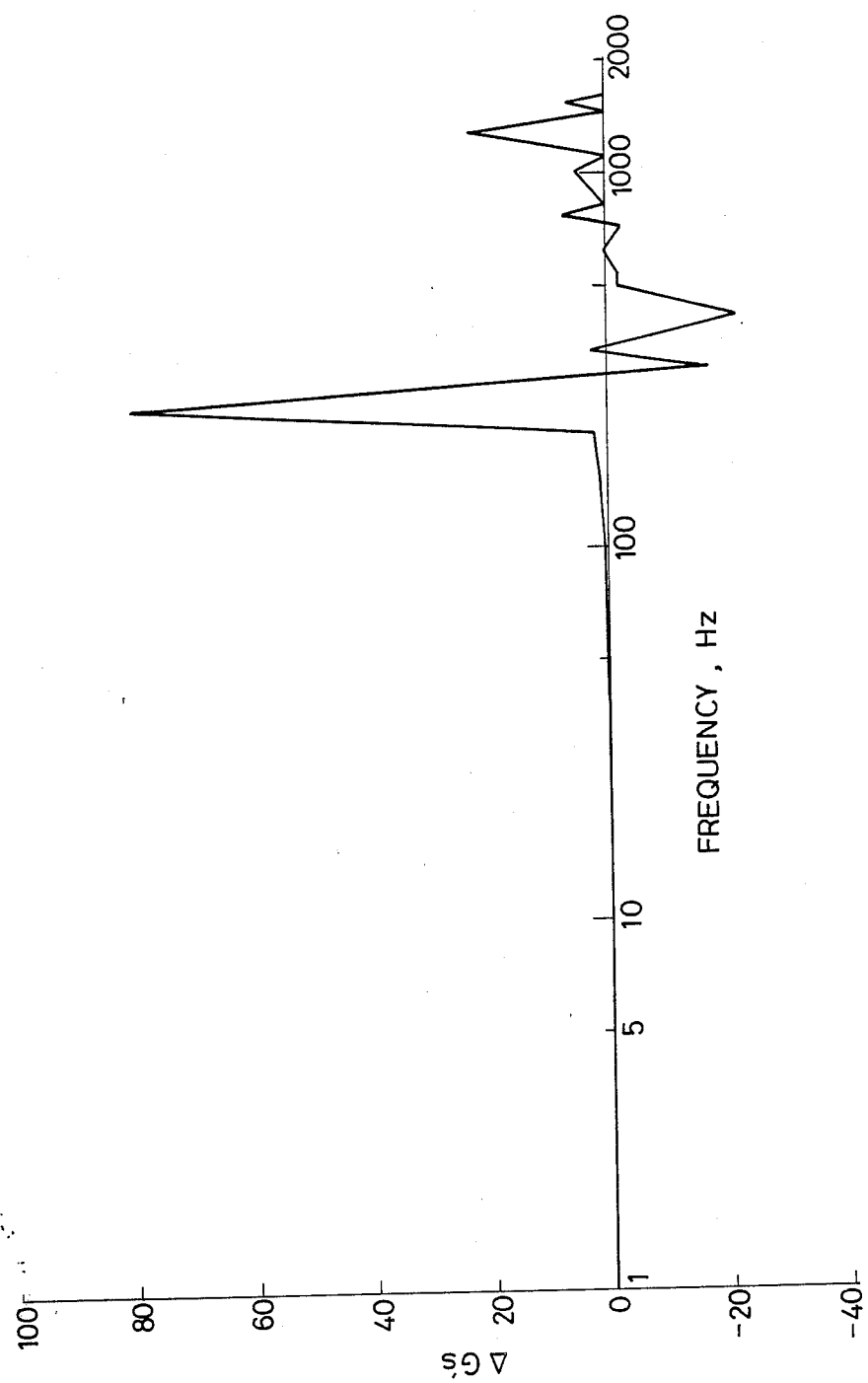

This USP gives in FIGS. 7 and 8 the data of dynamic vibration response (acceleration vs. frequencies) observed with or without the stiffener. The difference ($\Delta G$) in the two accelerations is attributable to the damping effect of the stiffener. It was calculated from the formula ($\Delta G$)=$G_8 - G_7$ (where $G_7$ is the acceleration in FIG. 7 which is obtained when the damper is not used, and $G_8$ is the acceleration in FIG. 8 which is obtained when the stiffener is used). $G_7$ and $G_8$ are shown in FIG. 38 which was drawn according to the data given in FIGS. 7 and 8 in said U.S. Pat. No. 4,566,231. The data of $\Delta G$ obtained from $G_7$ and $G_8$ shown in FIG. 38 are given in FIG. 39. (FIG. 38 has the logarithmic ordinate and FIG. 39 has the linear ordinate.) It is noted from FIG. 39 that the stiffener disclosed in the USP produces the maximum damping effect at 244 Hz and the second largest damping effect in the neighborhood of 1000 Hz, especially at 1200 Hz.

The data apparently indicate that the stiffener disclosed in the USP produces almost no damping effect at frequencies under 100 Hz and produces completely no damping effect at earthquake frequencies of 1 to 10 Hz, especially 4 to 5 Hz. This suggests that the stiffener will not effectively function when used as an anti-seismic device. The fact that the earthquake frequencies are mostly in the range of 1 to 10 Hz, especially 4 to 5 Hz, is clearly indicated in the following literature.

SEISMIC RESPONSE OF LIGHT INTERNAL EQUIPMENT IN BASE ISOLATED STRUCTURES by James M. Kelly and Hsiang-Chuan Tsai (Report No. UCB/SESM-84/17), Department of Civil Engineering, University of California, Berkeley, Calif., September 1984. (Figures in page 58).

In the meantime, the rubber compositions disclosed in U.S. Pat. No. 4,050,665 and U.S. Pat. No. 4,483,426 were tested for their characteristic properties. The results are shown below. It is noted that the hysteresis ratio ($h_{50}$) is much lower than that in the present invention.

|  | U.S. Pat. No. 4,050,655 | U.S. Pat. No. 4,483,426 |
| --- | --- | --- |
| Composition (parts by weight) | Polydimethylsiloxane 80 Silica 20 Dicyclopentadiene 0.5 | Butyl rubber 100 GPF carbon 33 Zinc oxide 5 Vulcanizing agent and others 8 |
| Breaking strength (kg/cm$^2$) | 26 | 44 |
| Elongation at break (%) | 500 | 470 |
| Hysteresis ratio ($h_{50}$) | 0.13 | 0.19 |
| Hd | 32 | 49 |

The specification refers to the disclosure of application Ser. No. 078,621 filed on July 28, 1987.

What is claimed is:

1. An anti-seismic device which comprises anti-seismic rubber bearings and dampers arranged in parallel, said anti-seismic rubber bearing being formed by laminating a plurality of rigid hard plates and soft boards having a viscoelastic property one over another, said damper being composed mainly of a viscoelastic material having the physical properties (i) and (ii) defined below.
    (i) the hysteresis ratio ($h_{50}$) is greater than 0.3 at 50% tensile deformation at 25° C.
    (ii) the storage modulus (E) measured dynamically at a frequency of 5 Hz, a strain of 0.01%, and a temperature of 25° C. is in the range of $1 \leq E \leq 2 \times 10^4$ (kg/cm$^2$).

2. An anti-seismic device as claimed in claim 1, wherein the viscoelastic material has an elongation higher than 1% at tensile break.

3. An anti-seismic device as claimed in claim 1, wherein the viscoelastic material is unvulcanized rubber or vulcanized rubber, or resin or plastic material having the above-defined characteristic properties.

4. An anti-seismic device as claimed in claim 3, wherein the unvulcanized rubber is one which has a Mooney viscosity $ML_{1+4}$ greater than 10 at 100° C.

5. An anti-seismic device as claimed in claim 1, wherein the damper is a laminate flexible body composed of a plurality of rigid hard plates and soft layers of viscoelastic material interposed between the rigid hard plates.

6. An anti-seismic device as claimed in claim 1, wherein the damper is a flexible body composed of a viscoelastic material and a solid substance embedded in said viscoelastic material.

7. An anti-seismic device as claimed in claim 1, wherein the damper is a flexible body composed of a viscoelastic material alone.

8. An anti-seismic device as claimed in claim 1, wherein the damper is a flexible body composed of at least one skeleton of reticulated structure, corrugated structure, honeycomb structure, and woven stuff, and a viscoelastic material.

9. An anti-seismic device as claimed in claim 5, wherein the flexible body is covered with vulcanized rubber.

10. An anti-seismic device as claimed in claim 1, wherein the flexible body is covered with a rubber material having good weather resistance.

11. An anti-seismic device as claimed in claim 1, wherein the anti-seismic rubber bearing has a void in which the damper is placed.

12. An anti-seismic device as claimed in claim 11, wherein the damper is arranged in the void of the anti-seismic rubber bearing with a material less resilient than the damper interposed between them.

13. An anti-seismic device as claimed in claim 1, wherein the damper is arranged in the void of the anti-seismic rubber bearing, and space or a layer which contains air is arranged between the damper and the anti-seismic rubber bearing.

14. An anti-seismic device as claimed in claim 11, wherein the damper has a hole extending in the same direction as said void and the hole is filled with an elastoplastic body.

15. An anti-seismic device as claimed in claim 14, wherein the elastoplastic body is lead.

16. An anti-seismic device as claimed in claim 14, which has flanges which hold between them the anti-seismic rubber bearing, damper, and elastoplastic body at both ends of the axis in which said void extends.

17. An anti-seismic device as claimed in claim 16, wherein said elastoplastic body is fixed by the holders attached to the flanges.

18. An anti-seismic device as claimed in claim 1, wherein said hysteresis ratio ($h_{50}$) is 0.35 or above.

19. An anti-seismic device as claimed in claim 1, wherein said hysteresis ratio ($h_{50}$) is 0.4 or above.

20. An anti-seismic device as claimed in claim 1, wherein at least part of said damper is made of only slightly vulcanized rubber which is formed by vulcanizing a rubber compound incorporated with a vulcanizing agent in an amount equal to 1 to 70 wt % of the minimum amount in common practice.

* * * * *